US005482323A

United States Patent [19]
Hicks

[11] Patent Number: 5,482,323
[45] Date of Patent: Jan. 9, 1996

[54] AUTOMOTIVE FRAME SHORTENING DEVICE

[76] Inventor: Robert L. Hicks, Rte. 1, Box 265, Glyndon, Minn. 56547

[21] Appl. No.: 431,496

[22] Filed: Apr. 28, 1995

[51] Int. Cl.$^6$ .................................................. B62D 21/12
[52] U.S. Cl. .......................... 280/785; 280/781; 280/800; 29/401.1
[58] Field of Search ..................................... 280/785, 786, 280/781, 800, 797; 29/401.1, 416; 296/29, 30, 185

[56] References Cited

U.S. PATENT DOCUMENTS

| | | | |
|---|---|---|---|
| 2,801,863 | 8/1957 | Raney et al. | 280/800 |
| 3,088,749 | 5/1963 | Schilberg | 280/797 X |
| 4,369,559 | 1/1983 | Phillips | 296/185 X |
| 4,599,780 | 7/1986 | Rohrbacher | 29/401.1 |
| 4,654,946 | 4/1987 | Phillips | 29/401.1 |
| 5,351,400 | 10/1994 | Samuel | 29/401.1 X |

FOREIGN PATENT DOCUMENTS 2708552  2/1995  France ..................................... 280/785

*Primary Examiner*—Richard M. Camby
*Assistant Examiner*—Christopher Ellis
*Attorney, Agent, or Firm*—Curtis V. Harr

[57] ABSTRACT

A Automotive Frame Shortening Device used in the shortening of original equipment automotive frames in the building of kit cars or custom hot rods. The frame shortening device provides an inexpensive yet reliable and extremely rigid and durable means of shortening automotive frames. The shortening of these frames is accomplished without the use of welding or cutting torches so as to leave the automotive frames molecular structure uncompromised.

6 Claims, 5 Drawing Sheets

AUTOMOTIVE FRAME SHORTENING DEVICE

BACKGROUND OF THE INVENTION:

This invention relates to an improvement in the method invoked in the shortening of original equipment automotive frames in the building of the many "kit" cars or custom "Hot Rods" on the market today. More specifically, the Automotive Frame Shortening Device provides an inexpensive, reliable, and extremely ridged and durable method of reattaching the shortened frames of automobiles when used in a "kit" car or "Hot Rod" type application.

With the vast increase in the demand, value, and resale prices of classic and antique automobiles over the recent past, many automobile enthusiasts have opted for the less expensive, and often the only, option of building "kit" car replicas of such automobiles. This allows these enthusiasts the thrill of owning and driving "show-room" condition classic cars (such as the 1967 Corvette Convertible) without the large financial investment necessary to acquire an original. The Automotive Frame Shortening Device provides a reliable and safe method of building such a car.

Prior to the present invention, when building a "kit", car the necessary shortening of the original equipment automotive frame was accomplished by cutting out the desired length from the center portion of the frame with a cutting torch and welding the remaining sections back together. This process has two inherent problems in the resulting structural integrity of the frame: the intense heat created in the cutting and welding process alters the molecular structure of the steel used in the original equipment frame; and, the strength of the original equipment frame is compromised by the process. This is often an unacceptable result as the frame is such a critical component of an automobile; the frame of the automobile is the structural backbone of all automobiles providing the attachment points and support for all of its major components including the engine, drive line, body, and wheels. This makes it imperative that a shortened frame be capable of withstanding the horizontal and vertical stresses placed upon it.

The strengthening of the frame is especially important in this application due to the fact that many, if not all of the "kit" cars being built are either by their nature high performance automobiles or are modified by their owners to be so. The resulting increases in performance places greater degrees of structural stress on all of the cars components, including the cut and welded frame. This is especially true when this method of rejoining the severed frame is used in conjunction with the high performance components of today's "kit" cars.

From the foregoing discussion, it can be seen that it would be advantageous to provide a method of reattaching a shortened original equipment automotive frame in a manner that would maintain or increase the structural integrity of said frame. The present invention addresses this problem of reattaching a shortened frame while avoiding changes to the molecular structure of said frame (and the weakening thereof) encountered when the prior cutting torch and welding practice was incorporated. The Automotive Frame Shortening Device accomplishes this result in an inexpensive, reliable, extremely ridged and durable method which is capable of withstanding the stresses placed upon it not only in normal use, but also when used in conjunction with the high performance components used in many "kit" cars today. The present invention also offers other advantages over the prior art and solves problems associated therewith.

SUMMARY OF THE INVENTION

In accordance with the present invention, a method of reattaching a shortened automotive frame without the use of a cutting torch or welding is provided.

The Automotive Frame Shortening Device is comprised of two external replacement frame members which fit over and attach to the respective sides and pieces of the shortened original equipment automotive frame. These replacement frame members fit over the outside edges of the cut automotive frame and are attached to said frame by means of vertically mounted bolts which pass through the upper and lower surfaces of the replacement and original frame members and are secured in such position by the threading of nuts and bolts through holes located on the inner surface of the original equipment frame. The bolts are spaced along both the upper and lower lengths of the two replacement frame members. In addition to these vertical bolts, two horizontal bolts may be attached to each of the replacement frame members through the vertical surface of the original equipment frame and into the vertical surface of the replacement frames.

The Automotive Frame Shortening Device also adds lateral strength to the automotive frame through the use of a structural box channel which is permanently attached to and runs the length of the two replacement frame members.

The described configuration allows for the reattachment of a shortened automotive frame in a manner that provides a very ridged and durable joint. In addition, the present invention avoids the problems encountered in the prior art of changes in the molecular structure of the original equipment frame (which affects its rigidity and strength) due to the use of intense heat in the cutting and welding of said frame. This is accomplished by the use of the bolting of the replacement frame members to the original frame as previously described and by cutting out the necessary portion of the said frame by the use of a saw instead of a cutting torch.

The above described features and advantages of novelty are pointed out with particularity in the claims of the present application. However, for a better understanding of the present invention, reference should be made to the drawings in which there is illustrated and described preferred embodiments of the present invention.

Figure 1:
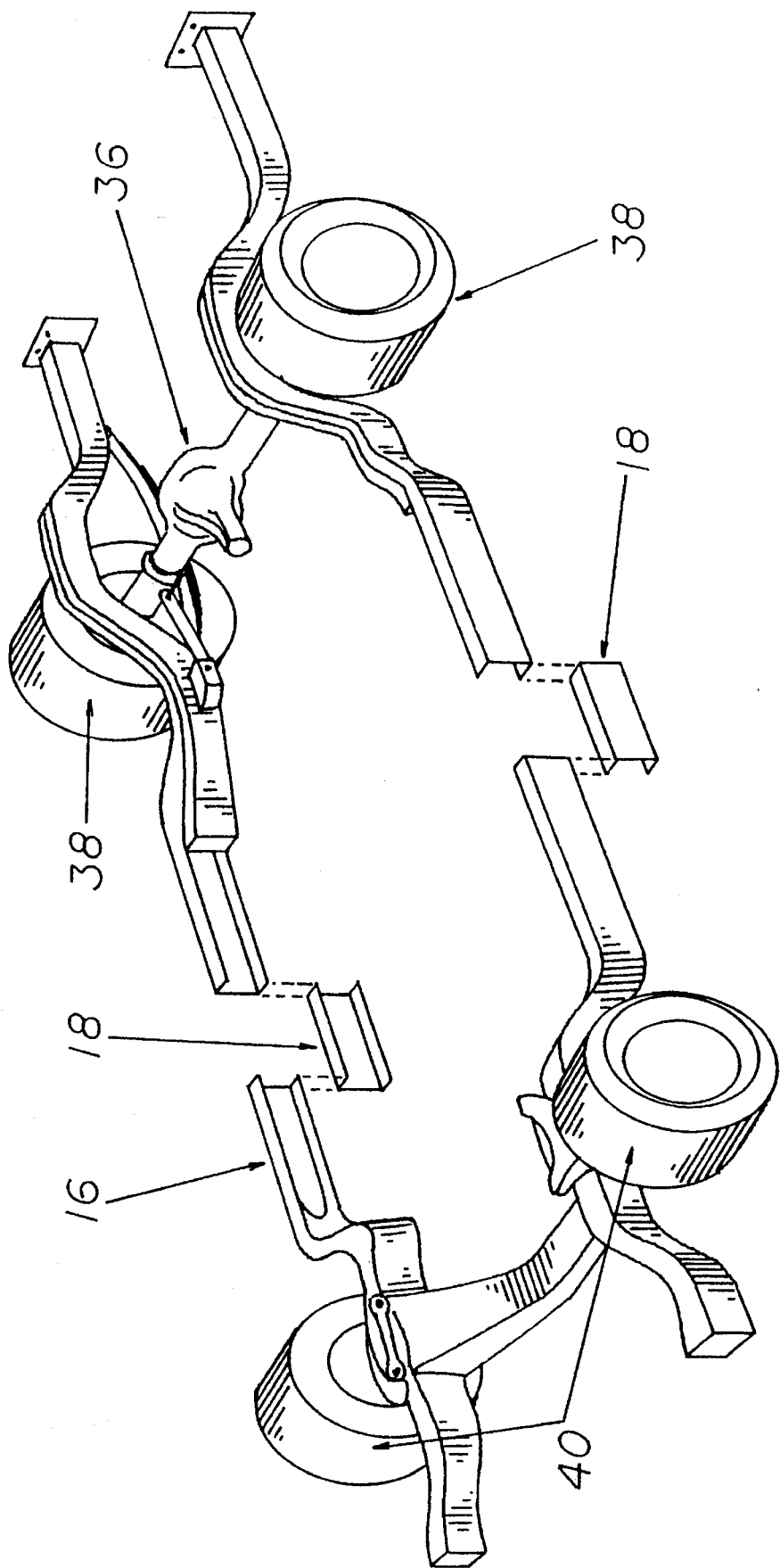
FIG. 1 is a perspective view of a frame and chassis typically used in the application of the Automotive Frame Shortening Device. The figure also shows the manner and area in which a section of said frame is removed in order to accomplish the desired shortening.

DESCRIPTION OF THE PREFERRED EMBODIMENT:

FIG. 1 shows a typical original equipment automotive frame 16 which is used as a base for the building of "kit" cars. The original equipment frame 16 comes from a "donor" car which not only provides said frame 16, but also the rear axle assembly 36, the rear wheels 38, the front wheels 40, and many other components used in the construction of the "kit" car.

When building a "kit" car using this frame 16, it is necessary to shorten the frame 16 in order to accommodate the shorter wheel base of the typical "kit" car. This is accomplished by removing a section of the frame 18 from the center section of the original equipment frame 16 between the rear axle 36 and the rear wheel 38 assembly and the front wheels 40. The removed section 18 is cut from the original frame 16 by means of a saw in such a manner that allows the remaining section of the original frame 16 to fit tightly together in the shortened configuration.

Figure 2:
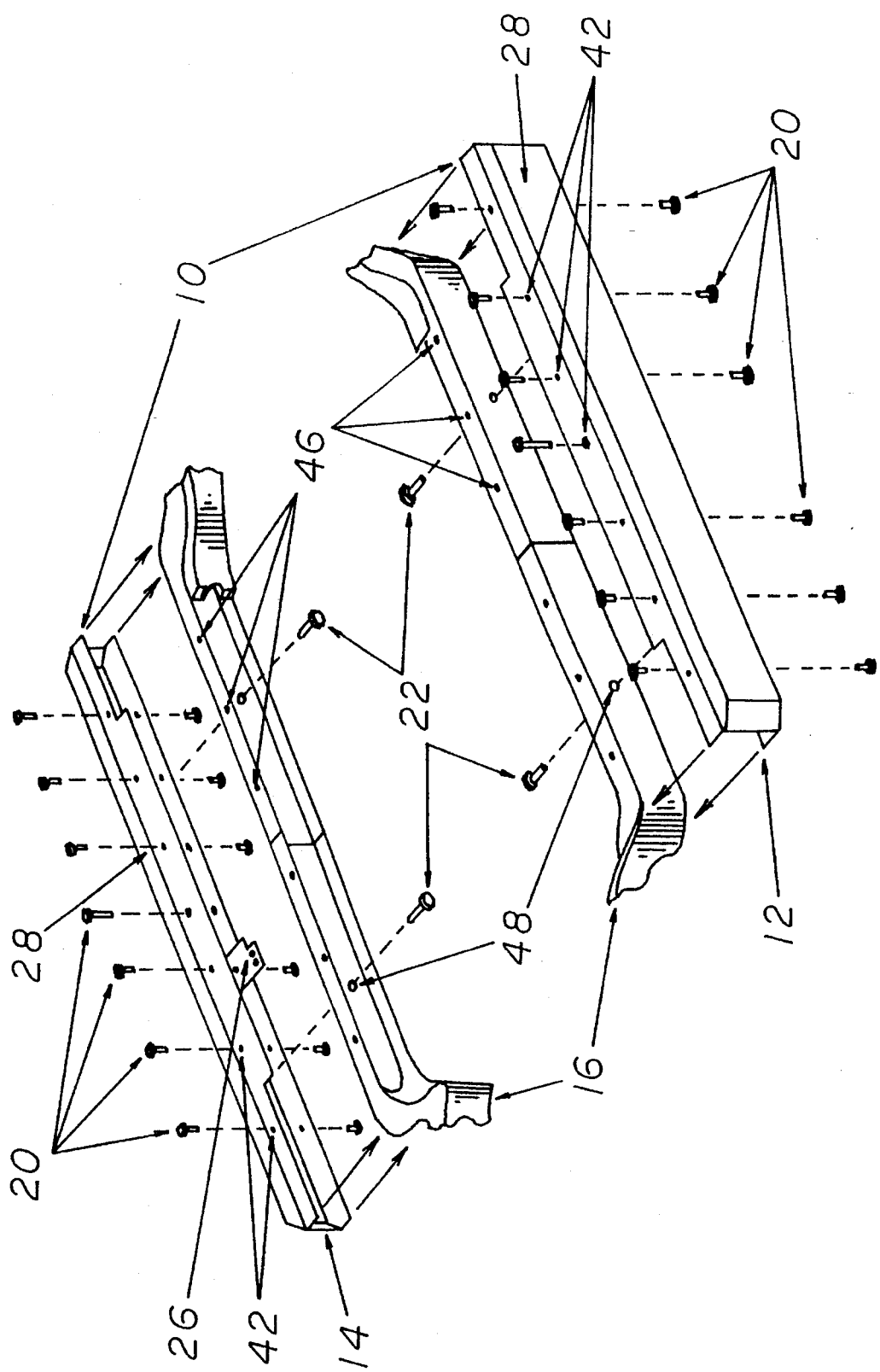
FIG. 2 is perspective cut-away view of the present invention showing the manner in which it fits and is attached to the center portion of the shortened frame and the orientation of its major components to said frame.

FIG. 2 shows the original frame 16 as it fits together in its shortened form and the manner in which the Automotive Frame Shortening Device 10 attaches to it. The left replacement frame member 12 and the right frame replacement member 14 fit over the outside edge of the shortened original frame 16. Once the replacement frame members 12 and 14 are in place, the pre-drilled vertical attachment bolt holes 42 in the replacement frame members 12 and 14 are used as guides for the drilling of the drilled vertical attachment bolt holes 46 in the upper and lower surfaces of the original frame 16.

Once the replacement frame members 12 and 14 are in place, the vertical attachment bolts 20 and the horizontal attachment bolts 22 are threaded into place and secure the replacement frame members 12 and 14 to the shortened original frame 16. Added strength is supplied to the Automotive Frame Shortening Device by the use of the two structural channel box supports 28 that are permanently attached to and run the length of the replacement frame members 12 and 14. This configuration gives the present invention its extreme rigidity and durability while maintaining the molecular integrity of the original frame 16. Additionally, the frame cross member mounting trays 26 are attached to the lower surfaces of the replacement frame members 12 and 14.

Figure 3:
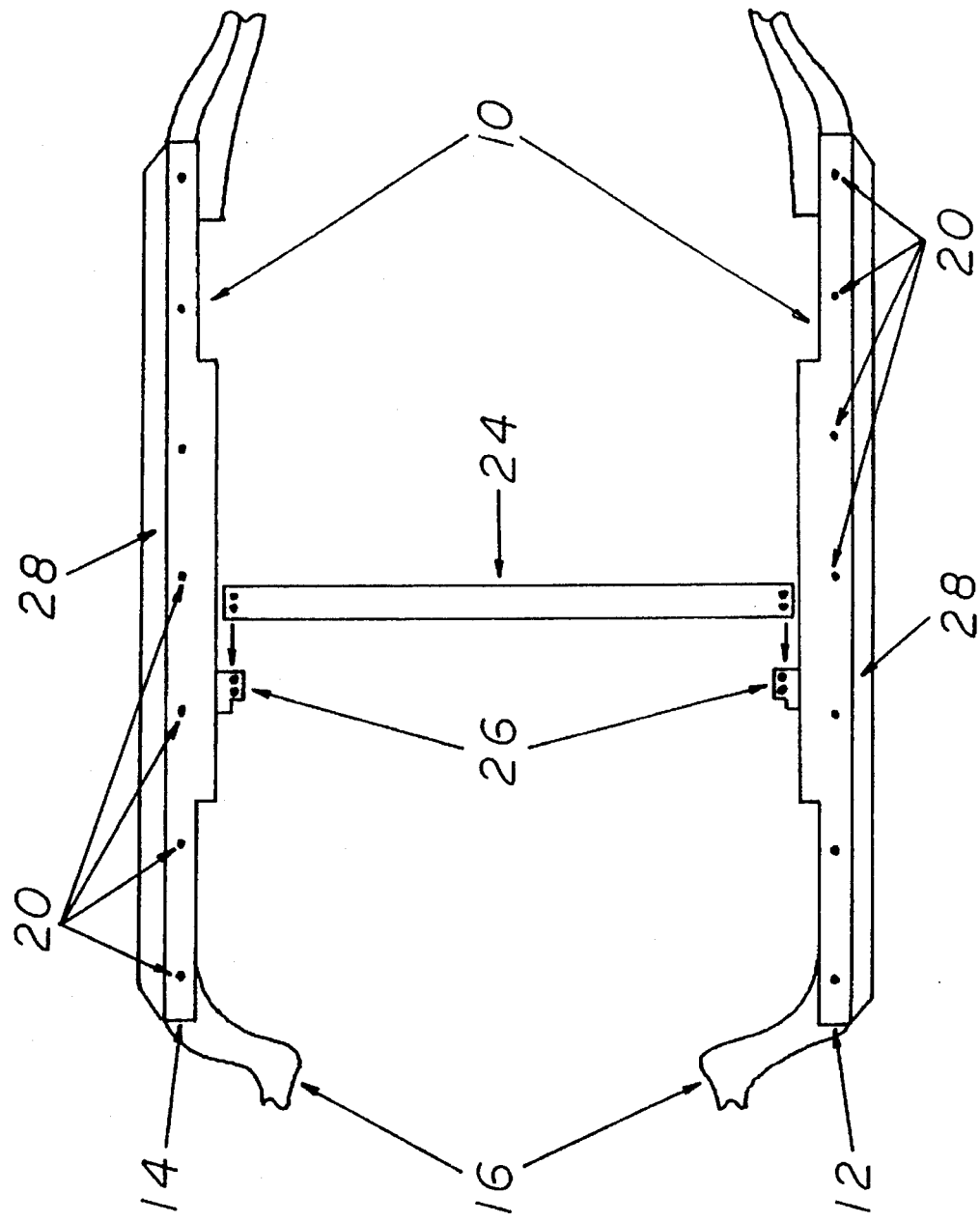
FIG. 3 is a top elevation cut-away view of the Automotive Frame Shortening Device showing it as attached to the original frame and the manner in which the original equipment frame cross member and the manner and point of attachment to the present invention.

FIG. 3 shows the Automotive Frame Shortening Device 10 as it is in its attached configuration to the original frame 16 with the replacement frame members 12 and 14 and the vertical attachment bolts 20 in their engaged position. The figure also shows two of the main strengthening components of the present invention. The structural box channel supports 28 run the length of the two replacement frame members 12 and 14 along the outside vertical face of said members and enhance both the lateral and horizontal integrity of the present invention. The frame cross member mounting trays 26 are mounted to the lower surfaces of the replacement frame member 12 and 14 and provide for the attachment of the original equipment cross member 24. This configuration allows the Automotive Frame Shortening Device 10 to maintain the original structural integrity provided by the frame cross member 24 by simply bolting it back into place.

Figure 4:
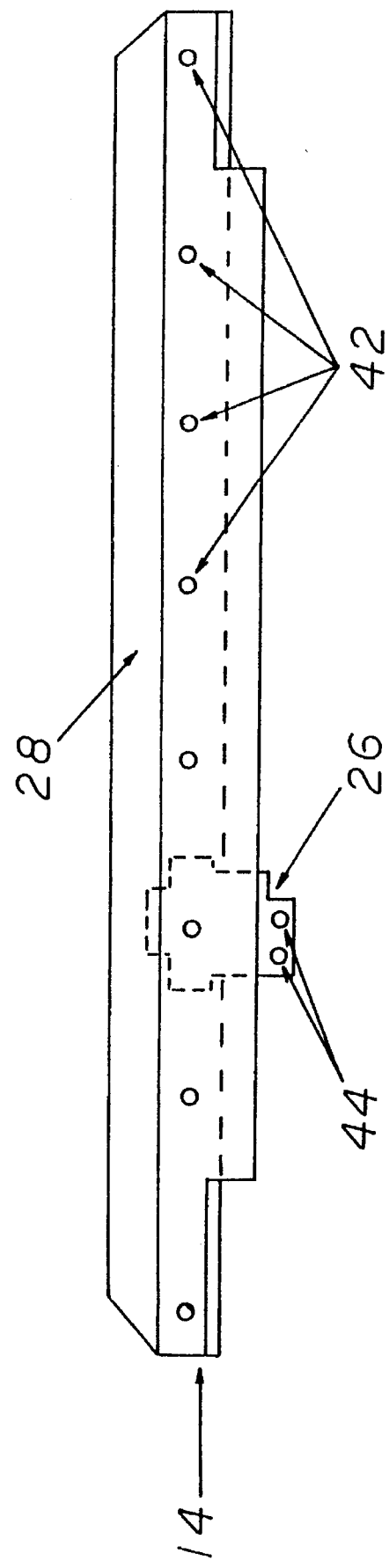
FIG. 4 is a top elevation view of one side of the present invention showing the manner of its construction along with the orientation of the mounting holes and the frame cross member mounting tray.

FIG. 4 shows the right side replacement frame member 14 in a disengaged position. The vertical attachment bolt holes 42 are spaced along both the upper and lower horizontal surfaces of the replacement frame member 14 and serve as drilling guides in the installation process. The structural channel box supports 28 are permanently attached to the outside vertical surface of the replacement frame member 14 and provide both lateral and horizontal structural integrity to said frame member 14. The frame cross member mounting trays 26 are attached to the lower horizontal surface of the replacement frame member 14 and contain the cross member mounting bolt holes 44 used in the installation of the present invention. It is important to note that the cross member mounting trays 26 may be attached at varying positions on the replacement frame member 14 depending upon the amount of shortening required by the specific application.

Figure 5:
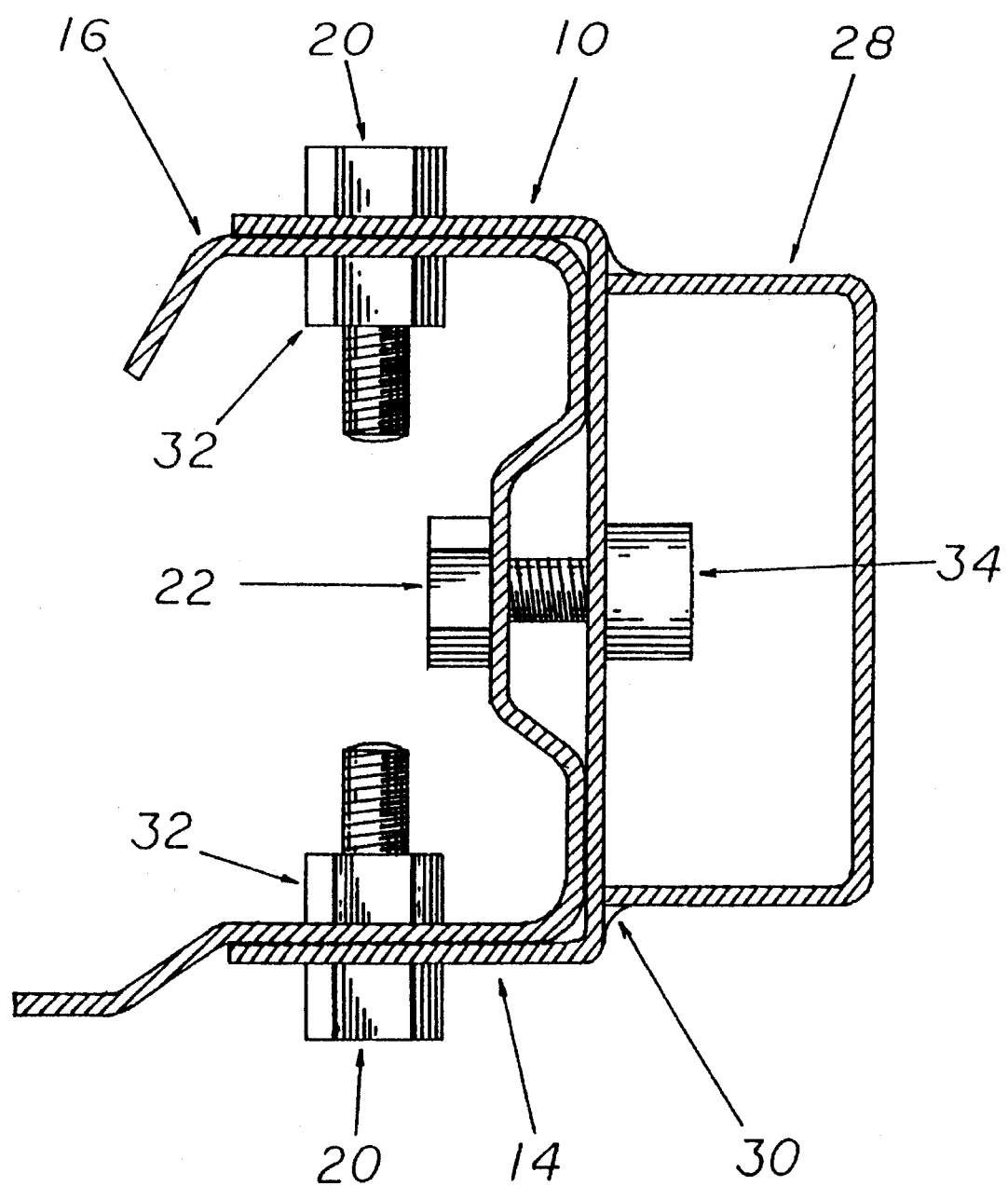
FIG. 5 is a cross sectional view of the present invention showing the manner in which it fits over the original frame and its manner of attachment to said frame. The figure also show the orientation of the structural box channel support as it is welded to the outside vertical surface of the Automotive Frame Shortening Device.

FIG. 5 shows the method of attachment of the Automotive Frame Shortening Device 10 to the original frame 16. The vertical attachment bolts 20 pass through the replacement frame member 14 and the original frame 16 and then thread into the inner fastening nuts 32 thereby securing the replacement frame member 14 and the original frame 16 together. The horizontal attachment bolts 22 pass through the horizontal surfaces of the replacement frame member 14 and the original frame 16 and thread into the attached threaded fastening point 34. In addition, the structural box channel support 28 is permanently attached by means of the weld 30 to the replacement frame member 14. These features provide the Automotive Frame Shortening Device 10 with a method of secure attachment to the original frame 16 while maintaining the structural integrity demanded by the application.

It is important to note that the overall length of the Automotive Frame Shortening Device 10 may be varied by its producer depending upon the amount of shortening of the original frame 16 necessitated by the type of "donor" car used and the type of "kit" car being built. Be this as it may, the method of attachment and the structural integrity of the end result does not vary.

Although the present invention has been described in considerable detail with reference to certain preferred versions thereof, other versions are possible. Therefore, the spirit and scope of the appended claims should not be limited to the description of the preferred versions contained herein.

What is claimed is:

1. An Automotive Frame Shortening Device comprising:
   a channel type replacement frame member having an upper and lower horizontal surface and a single vertical surface said member further having vertical bolt attachment holes spaced along its upper and lower surface and horizontal bolt attachment holes spaced along its vertical surface;
   a structural channel box support weldably attached to the outside of said channel type replacement frame members vertical surface; and
   a means for mounting said frame shortening device to a shortened automotive frame.

2. An Automotive Frame Shortening Device as in claim 1 wherein said means for mounting said frame shortening Device is a plurality of threadable bolt and nut fasteners.

3. An Automotive Frame Shorting Device as in claim 2 further comprising a frame cross member support tray weldably attached to the lower horizontal surface of the channel type replacement frame member.

4. A Shortened Automotive frame comprising:
   an automotive frame having two substantially parallel frame members a pair of wheels at the front of the parallel frame members, a pair of wheels at the rear of said parallel frame members, said frame members having a vertical cut portion dividing the frame between said front and rear wheels, a channel type replacement frame member having an upper and lower horizontal surface and a single vertical surface said member further having vertical bolt attachment holes spaced along its upper and lower surface and horizontal bolt attachment holes spaced along its vertical surface for joining said cut vertical frame members, a structural channel box support weldably attached to the outside of said channel type replacement frame members vertical surface; and a means for mounting said frame shortening device to said automotive frame.

5. A shortened automotive frame as in claim 4 wherein said means for mounting said frame shortening device to said automotive frame is a plurality of threadable bolt and nut fasteners.

6. A shortened automotive frame as in claim 5 further comprising a frame cross member support tray weldably attached to the lower horizontal surface of the channel type replacement frame member.

* * * * *